United States Patent Office 3,183,952
Patented May 18, 1965

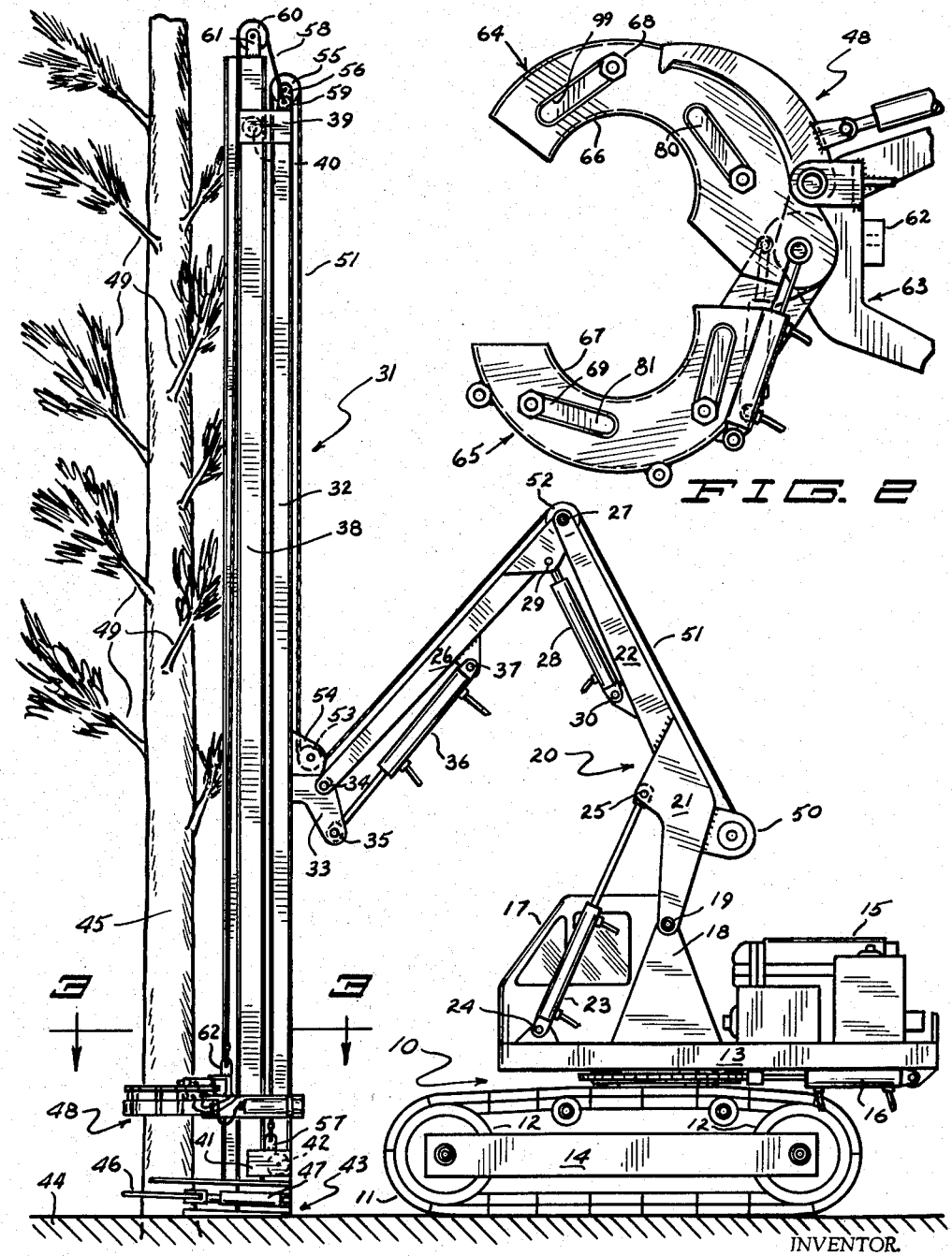

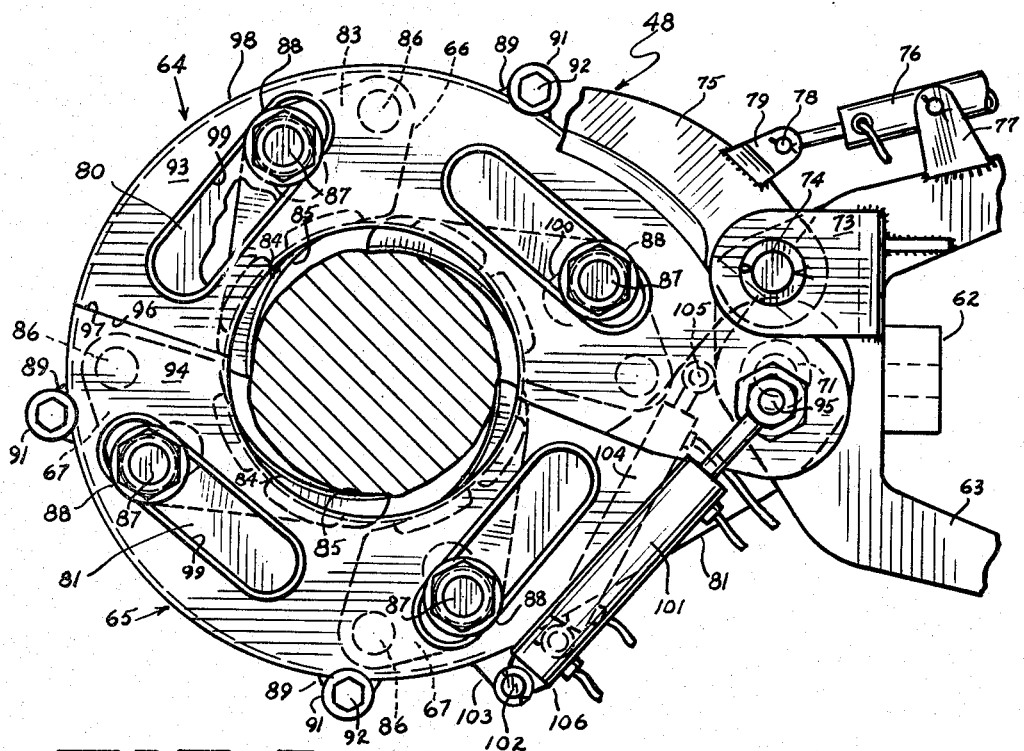
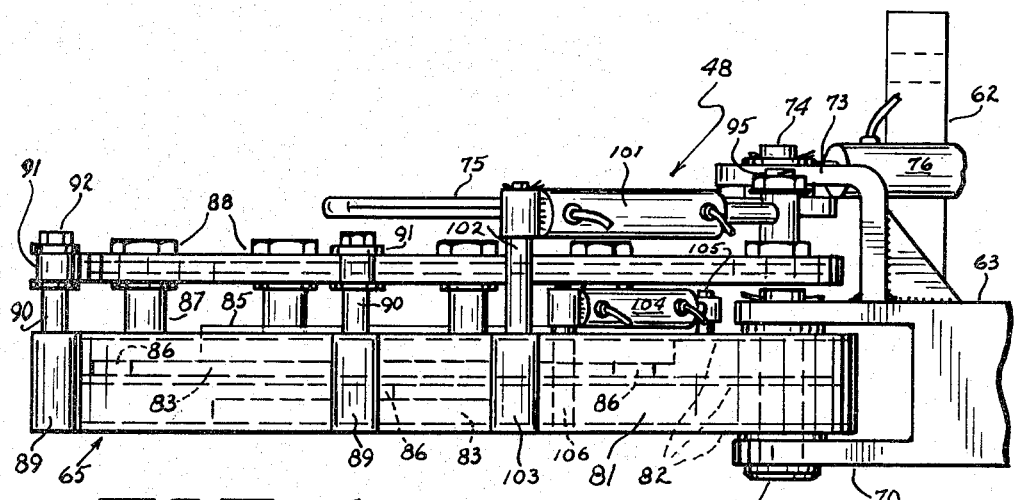

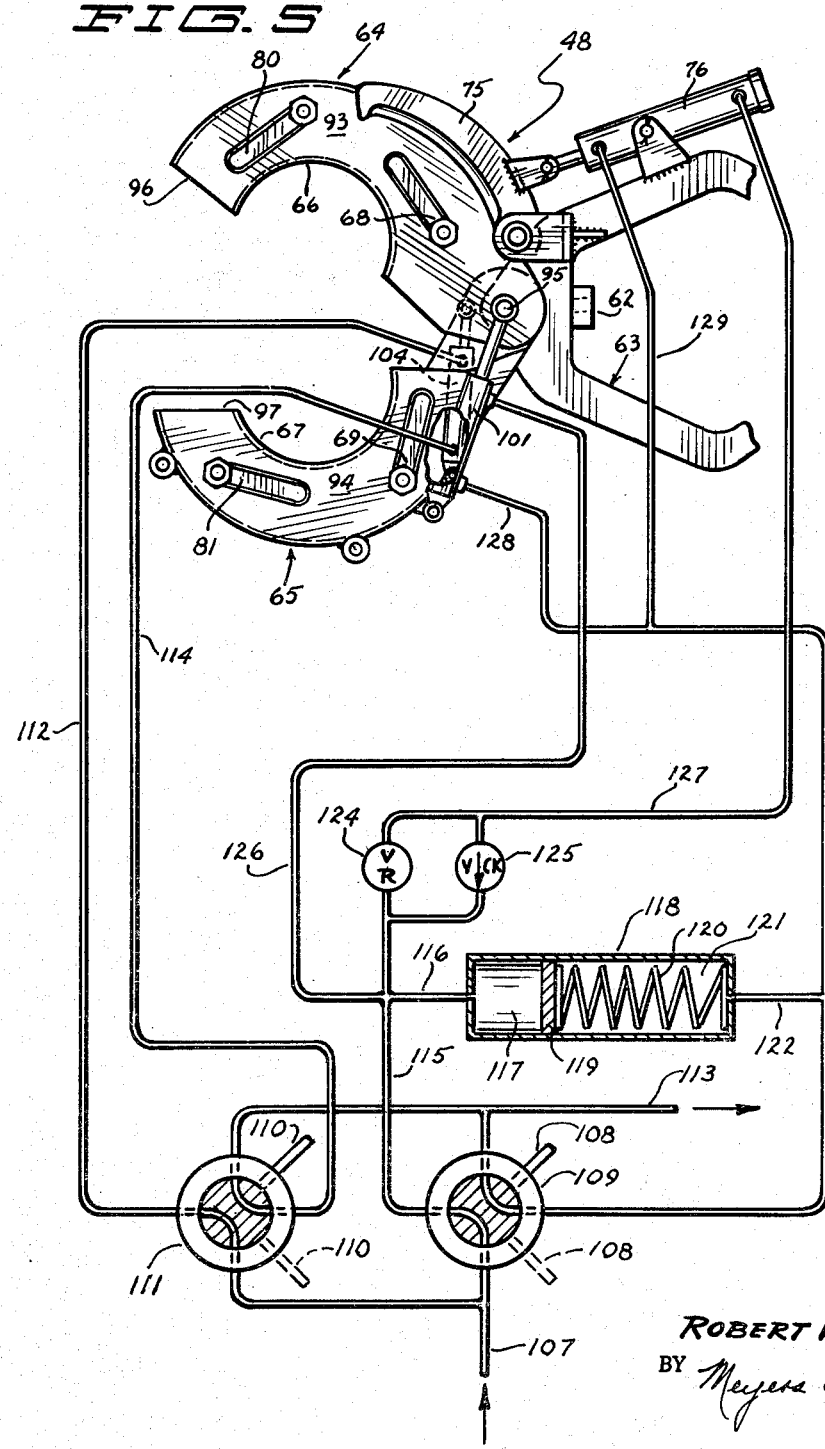

3,183,952
CAMMED BLADE CUTTER HEAD FOR
DELIMBING TREES
Robert W. Larson, Ashland, Wis., assignor to Beloit
Corporation, Beloit, Wis., a corporation of Wisconsin
Filed June 28, 1963, Ser. No. 291,501
9 Claims. (Cl. 144—3)

This invention relates to the processing of standing trees and more particularly to an assemblage for removing unwanted portions of a tree before it is felled and further processed. Reference is made to patent applications in which the present inventor is co-inventor, to wit: Serial No. 196,195, filed May 21, 1962, now abandoned, and continuations-in-part thereof, Serial No. 287,042 filed June 11, 1963, and 285,114 filed June 3, 1963.

In the co-pending cases, apparatus is described which provides for a swift delimbing of all the branches of a standing tree. The heavy delimber head has a degree of momentum which shears off the limbs and smaller branches by a force which is largely impact in nature as opposed to a pressing or sawing type cutting action. In the inventions set forth in said prior and present co-pending cases, the swift rise of the delimber causes branches to literally shower down around a standing tree, the entire operation being performed on large trees in a matter of a few seconds. While this novel type of tree processing lends itself to any style of lumbering operation, it has particular significance in conifer tree harvesting wherein selective areas of forests having trees of uniform development are cut and reseeded under the brush created by the delimbing operation. In this type of tree harvesting the randomly disposed cut branches are further broken and compacted where they lie by such means as the tracks of a crawler type vehicle. The brush mat which is formed protects the seedlings and assists in the retention of moisture in the soil.

It is within the contemplation of the present invention and a general object thereof to provide an improved cutter head assemblage for use in impact shearing of tree branches.

More specifically, it is an object of the invention to provide a cammed blade delimber assemblage wherein each of a plurality of blades is positively and simultaneously advanced as the assemblage is swiftly raised in encircling engagement with a tree trunk so as to conform to the diminishing diameter of the trunk and to shear by impact all of the branches traversed by the assemblage.

A further object of the invention is to provide a cutter head assemblage, the blades of which are actuated by a rotating cam ring, yet which has provision for splitting the entire assemblage including the cam ring when opening to engage or disengage the trunk in its encircling engagement therewith.

Yet another object of the invention is to provide a cutter head assemblage in which a split ring body portion and a split ring cam portion combine to exert a following action on the blades to conform to the diameter of a tree trunk and then to exert a holding or gripping force on the trunk.

A still further object of the invention is to provide a hydraulic system for operating independently and simultaneously the body and cam portions and further for effecting a severing operation on the top of a delimbed tree.

These and other objects and advantages of this invention will more fully appear from the following description, made in connection with the accompanying drawings, wherein like reference characters refer to the same or similar parts throughout the several views and in which:

FIGURE 1 is a side elevation of the complete apparatus for delimbing, topping and felling a standing tree, the cutter head being engaged in readiness for the delimbing operation.

FIGURE 2 is an enlarged top plan view of the cutter head assemblage showing the ring portions of the assemblage in split or open position for engagement of a tree trunk;

FIGURE 3 is a further enlarged top plan view of the cutter head assemblage with the split ring portions in operative position about the trunk of a tree, portions thereof being cut away to better show the operation of the device;

FIGURE 4 is a side elevation of the cutter head assemblage with the tree trunk to better illustrate the position of the parts, and FIGURE 5 is a schematic view of the cutter head assemblage showing the hydraulic operating and control mechanism for the entire assemblage.

With continuing reference to the drawings, and particularly to FIGURE 1, a vehicle is indicated at 10 generally. The vehicle is of the crawler type having tracks 11 operated by wheels 12 as shown. A swingable platform 13 is mounted upon the chassis frame 14 which in turn is supported upon the wheels and tracks previously mentioned. A motor 15 for supplying hydraulic pressure and motivating force to the vehicle is mounted at the rear portion of the platform 13. Power means 16 is supplied to rotate the platform 13 together with the delimber apparatus disposed thereon. A cab 17 may be conveniently disposed upon the platform 13 in order to seat an operator who can view the position of the vehicle and the movement of the delimber apparatus. A mounting base 18 is secured to the medial area of platform 13 and has pivotally secured thereto at 19 an articulated reach boom assembly indicated generally at 20. The reach boom assembly has a rear boom section 21 pivotally connected to the pivot 19 and having an upwardly extending arm portion 22 as shown. A hydraulic actuator 23 is pivotally secured at 24 to the platform 13 and also is pivotally secured at 25 to the rear boom 21 as shown. The hydraulic actuator may be a conventional cylinder and piston assemblage being extensible and retractable by means of hydraulic fluid pressure through means not shown.

A second arm or boom 26 is pivotally mounted at 27 to the forward end of the arm 22 and may be rotated about the pivot 27 by means of a hydraulic actuator 28 pivotally secured at 29 to the boom 26 and also at 30 to the rear boom arm 22.

Carried at the end of the boom 26 of the reach boom assembly 20 is a sliding mast and standard assemblage indicated generally at 31. The standard 32 of the assemblage 31 is secured to a crank 33 to effect the mount thereof through pivot connection 34 at the end of the boom 26. Crank 33 is also pivotally secured at 35 to hydraulic actuator 36 which in turn is pivotally mounted at 37 to the end boom 26. Hydraulic actuator 36 in a manner similar to the previously mentioned actuators may be caused to extend and retract through the application of conventional hydraulic fluid lines. The mast 38 may comprise an I-beam or similar structure which is slidably mounted at the forward side of the standard 32. A bracket 39 is secured to the upper end of standard 32 and may be provided with rollers 40 to cooperate with the mast 38 and permit it to slide upwardly and downwardly with respect to the standard 32 while being retained in proximity thereto.

Similarly a bracket 41 may be secured in a rearwardly extending manner to the lower end of the mast 38 and may be provided with roller elements 42 for engaging the sides of the I-beam standard 32.

A felling mechanism is shown generally at 43 and this mechanism remains fixedly attached to the lower end of the standard 32 so as to form a base member to contact the ground 44 adjacent a standing tree 45 as shown. The felling mechanism 43 has a severing blade means 46 and hydraulic actuating means 47 associated therewith. Details of suitable tree felling means are set forth in the co-pending applications mentioned earlier in this specification.

The cutter head assemblage which comprises the present invention is indicated generally at 48. The assemblage is secured to the lower portion of the mast 38 and is adapted to slide therewith vertically against the standard 32 when it is desired to remove the limbs 49 from the standing tree 45.

It is contemplated that a number of mechanisms may be employed for effecting the extension of mast 38 with respect to the standard 32. However, there is shown in FIGURE 1 a relatively simple means of accomplishing the extension which utilizes cable members in the manner to be presently described. A winch or other means for rapidly retracting cable members is shown at 50 and is mounted to the rear boom 21 as shown. The cable 51 extends forwardly along the rear boom arm 22 and is trained around a pulley 52 which may conveniently coincide axially with the pivot point 27. The cable 51 then extends along the end boom 26 and is trained about a pulley 53 which is rotatably mounted on bracket means 54 fixedly secured to the standard 32. Cable 51 then extends upwardly along the rear side of standard 32 and is trained about pulley 55 rotatably mounted in bracket 56 at the upper end of standard 32. From this position, the cable 51 extends downwardly to the lower end of the mast 38 where it is secured to anchor 57 which in turn is affixed to the bracket 41 and the lower end of the mast 38. It may be readily seen that retraction of the cable 51 will cause the entire mast 38 to be projected upwardly with respect to the standard 32 until the bracket 41 abuts the bracket 39.

A further cable 58 is anchored at 59 to the upper end of the standard 32 and is trained over a pulley 60 which in turn is rotatably mounted to bracket 61. Bracket 61 in turn is mounted fixedly at the top of the mast 38. The cable 58 extends downwardly from pulley 60 along the forward edge of the mast 38 and is anchored to lift means 62 which in turn supports the cutter head assemblage 48 as shown.

As described in the previous co-pending cases, the rise of the mast 38 through retraction of cable 51 causes the cutter head assemblage 48 to rise with respect to the mast 38. Since the mast 38 is also rising with respect to the standard 32, there is a compound movement which will place the cutter head assemblage 48 at the top of the mast 38 at the same time that the mast 38 reaches the uppermost position with respect to the standard 32.

A detailed disclosure of the cutter head assemblage 48 utilized with the previously described apparatus will now be set forth. Referring particularly to FIGURE 2, the assemblage 48 generally comprises a mounting frame 63 to which the lift means 62 is secured as shown. The frame 63 is mounted on the mast 38 at the forward edge thereof and is adapted to slide in guided relation thereon during the delimbing operation. Also forming a general part of the cutter head assemblage 48 are a pair of jaws 64 and 65. These jaws are adapted to swing convergently and divergently on the frame 63 so as to be engageable with the tree trunk 45 as shown in FIGURE 2. Each of the jaws 64 and 65 carry shearing means 66 and 67, respectively, which in turn are operated by cam means 68 and 69, respectively. The cam means causes the shearing means to lie closely adjacent the tree trunk 45 for shearing the limbs 49 as will be subsequently described.

In more particularity, the mounting frame 63 has a forwardly extending clevis portion 70 which carries the main pivot pin 71 as seen in FIGURE 4. Also carried by the mounting frame 63 is an upwardly and forwardly extending bracket 73 to which is pivotally mounted by pin 74 a topping knife 75. The topping knife is operated by the hydraulic actuator 76 which in turn is mounted on bracket 77 of the mounting frame 63. The actuator 76 is pivotally connected at 78 to a rearwardly extending bracket 79 on the topping knife 75. Normally, the topping knife blade 75 is in its retracted position as shown in FIGURE 3.

Each of the jaws 64 and 65 have a base ring portion 80 and 81, respectively, as shown in FIGURES 3 and 4. When the jaws are converged, the arcuate base portions form a complete ring for encirclement of the tree trunk 45. These base ring portions also provide housings for support of the shearing means as will be presently described. The housings are formed by a plurality of vertically spaced plates 82 with the respective shearing means 66 and 67 disposed therebetween. Each of the shearing means has a horizontal blade portion 83 and a vertical blade 84 concavely formed toward tree trunk 45 and terminating upwardly in an impact edge 85 as shown in FIGURE 3. Each of the horizontal plates 83 is pivotally mounted on a pin 86, the pins being alternately offset as shown in FIGURE 4 so that adjacent horizontal plate portions 83 will lie in upper and lower portions of the jaw housing formed by the spaced plates 82.

To each of the horizontal plate portions 83 of the shearing means, there is secured an upstanding cam pin 87 which terminates at its upper end in a cam follower 88. It will be apparent that when the cam pins 87 and their followers 88 are swung radially inward about the pins 86, each of the impact shearing members will swing toward the tree trunk 45 and come into engagement therewith.

Also forming a part of the base ring arcuate portions are bosses 89 into which stub shafts 90 are vertically threaded. Each of the stub shafts 90 has a roller 91 mounted thereon by means of cap screw 92 as shown in FIGURES 3 and 4. In order to define an arcuate line, three of such rollers 91 are employed, one mounted on the jaw 64 and two on the jaw 65. Rollers 91 all lie in the same horizontal plane for reception of the cam plate ringe which will now be described.

The cam plate ring is created by the arcuate cam plate portions 93 and 94 forming portions respectively of the jaws 64 and 65. The cam plate portions are pivotally secured together by the pivot pin 95 and when their outer ends 96 and 97 are abutted together, they will form a ring adapted to encircle the trunk 45 of a tree in cooperation with the base portions 80 and 81. With the cam plate portions in their closed relation, the outer circumference 98 of the composite ring forms an edge track or guide which rolls against the rollers 91 around a centerless axis.

Cam plate portions 93 and 94 are provided with cam slots 99, each of which receives a cam follower 88 for guided movement therealong. Slots 100 are cut into the housing plate portions 82 of the base to permit the cam pins 87 and their followers 88 to move inwardly and outwardly as they are influenced by the cam plate ring and the respective cam slots 99.

In order to rotate the cam ring relatively to the cam followers, a hydraulic actuator 101 is mounted at one end upon the cam ring pivot 95 and at the other end to pivot pin 102. The pivot pin 102 in turn is fixed to a boss 103 carried by the base portion 81 as shown in FIGURES 3 and 4. Another hydraulic actuator 104 is utilized to separate and converge the entire jaws 64 and 65. The actuator 104 is pivotally secured at 105 to the base portion 80 of jaw 64 and to pivot 106 which is affixed to the base portion 81 of the jaw 65.

In the use and operation of the cutter head invention, a hydraulic system is employed which is not detailed in FIGURES 1–4 but is set forth diagrammatically in FIGURE 5. To perform a complete operation upon a standing tree 45, the standard and mast assemblage 31 will be brought into vertical alignment adjacent the tree trunk as shown in FIGURE 1. The severing assemblage 43 will encircle the tree with shearing blade 46 disposed thereagainst as set forth in more detail in the herein-referred-to co-pending cases. The jaws 64 and 65 of the cutter head assemblage 48 are also in open position so as to receive the three trunk 45 at the lower position as shown in FIGURE 1. A source of pressurized hydraulic fluid enters the line 107 as shown in FIGURE 5. Handle 108 of valve 109 will be moved from a neutral position to the dotted line position of FIGURE 5. In this position, hydraulic actuators 76, 101 and 104 are all dumped in readiness for a cycle of operations. Details of the final steps will be subsequently described.

With the jaws 64 and 65 in open position as shown in FIGURE 5, the cutter head assemblage 48 may be advanced against a tree trunk 45. Valve handle 110 is then moved to its full line position of FIGURE 5 so that valve 111 will admit pressurized fluid from source 107 through line 112 and cause the hydraulic actuator 104 to retract. It will be recalled that the jaws 64 and 65 are pivotally interconnected and hence the retraction of actuator 104 will cause the jaws 64 and 65 to abut at their outer ends, thus encircling the tree trunk 45. Since the jaws 64 and 65 also include the cam ring portions 93 and 94, they will also swing concurrently with the base portions 80 and 81 of the jaws. In order to accomplish the simultaneous swinging, the actuator 101 is extended by the fullest amount so that its pivotal axis 95 coincides with the pivotal axis 71 of the base portion of the jaws. The cam ring portions and base portions can thus swing as a unit on a coincident axis since the respective portions lie in registered alignment with pressure still applied to the actuator 101. Entrapped hydraulic fluid at the rear end of hydraulic actuator 104 will be permitted to escape and return to a reservoir line 113 via the interconnecting tube 114.

The valve handle 108 of valve 109 is then advanced to the full line position of FIGURE 5. Pressurized fluid from line 107 will then advance through the conduit 115 and will divide so that a portion will enter the tube 116 and thence into the chamber 117 of the hydraulic accumulator 118. The piston 119 will move to the right against the force of compression spring 120 until equilibrium is established in the accumulator. Fluid in the rear chamber 121 of the accumulator 118 will be discharged through the line 122 into the common discharge line 123 and then through valve 109 to the reservoir return line 113. The relief valve 124 and the check valve 125 will prevent the passage of fluid therethrough under the initial hydraulic pressure supplied to supply line 107. The pressurized fluid, however, will travel through the line 126 and cause retraction of the actuator 101 which will initiate rotation of the cam ring in a clockwise direction as viewed in FIGURE 3. The force applied to actuator 104 maintains the jaws 64 and 65 in abutted relation as the cam ring portions 93, 94 rotate within the rollers 91. The blades 85 of shear means 66 and 67 will all move inwardly against the tree trunk 45 by virtue of the camming action between cam followers 88 and cam slots 99. Equilibrium is rapidly established so that a constant biasing force is exerted by the vertical blade portions of the shear means against the tree trunk.

The valve handle 108 may now be moved to an intermediate shut-off position between the full and dotted line positions with the biasing force maintained because of the entrapped fluid in chamber 117 of hydraulic accumulator 118.

The cable 51 is now caused to pull back rapidly by virtue of the winch or similar retracting device 50 to cause the cutter head 48 to swiftly shoot up the tree trunk 45 in the manner previously outlined. The accumulated pressurized fluid in chamber 117 will continue to supply line 126 of the actuator 101 and force the cam ring portions or segments to rotate further in a clockwise direction as the cutter head rises. The shearing means 66 thus are all caused to follow the diminishing circumference of the tree trunk while the blades 84 shear by impact the branches 49. In a matter of several seconds, the branches are shorn from the trunk and the cutter head has advanced to the desired upper limit. At this position, increased hydraulic pressure is supplied through the line 107 to cause an increased holding force on actuators 104 and 101. When the line pressure exceeds a predetermined amount (for example, 1,500 pounds per square inch), the relief valve 124 passes fluid through line 127 which in turn will cause the actuator 76 to extend and force topping knife 75 across the diminished tree trunk 45 to sever the top thereof. Since the tree trunk 45 is gripped very firmly beneath the position of cutting, the tree will be maintained under control while the top is severed therefrom.

The valve handle 108 of valve 109 is now moved to the dotted line position which will reverse the flow of the hydraulic fluid into the common line 123. The hydraulic pressure is now dropped to the initial status and will pass through line 122 to the rear chamber 121 of accumulator 118 and will also pass into the line 128 which will relieve the force upon actuator 101 and cause fluid at the forward end of actuator 101 to be returned to the reservoir through the lines 126 and 115.

Simultaneously with the reversal of actuator 101, pressurized fluid will now pass from line 123 through the connecting line 129 to the forward end of actuator 76 and thereby will cause retraction of topping knife 75. The entrapped fluid in actuator 76 will find its way through the line 127, through check valve 125 and thence through line 115, valve 109 and to the reservoir return line 113. With the actuators 76 and 101 thus reversed, the cutter head assemblage 48 may be lowered to an intermediate position on the delimbed and topped tree trunk. Since pressure still is applied through line 112 to the actuator 104, the jaws 64 and 65 will remain close. The cutter head may then be stopped and positioned through means of cable 51 at some intermediate control position on the tree trunk and the valve handle 108 of valve 109 can be again moved to the full line position of FIGURE 5 with a hydraulic pressure of intermediate magnitude (under 1,500 pounds per square inch, for example), and the cam ring portions 93 and 94 will again move in a clockwise direction until the shearing blades 66 and 67 firmly grip the tree trunk. The severing mechanism 43 may then be operated so that the cutter blades 46 will sever the stump of the tree in a manner described in detail in prior co-pending cases identified above.

The delimbed, topped and severed tree may now be lowered to the ground by means of the vehicle and its boom mechanism. The jaws 64 and 65 lie in the same plane and maintain a stable grip upon the severed tree. Next the valve handle 108 of valve 109 is moved to its dotted line position to cause the actuator 101 to extend to its fullest position where the pivot pins 95 and 71 will be in axial alignment and the cam ring portions 93 and 94 will be respectively registered with their counterpart base portions 80 and 81. Now the valve handle 110 of valve 111 may be moved to the dotted line position to cause the actuator 104 to extend and to separate the entire jaws 64 and 65. The returning fluid from actuator 104 returns through the line 114, through valve 111 and to the reservoir return 113 as previously noted.

It will, of course, be understood that various changes may be made in the form, details, arrangements and proportions of the parts without departing from the scope of my invention as set forth in the appended claims.

What is claimed
1. A cutter head assemblage for delimbing standing trees which comprises:
  (a) a mounting frame adapted to be positioned adjacent the trunk of a tree;
  (b) a first jaw swingably mounted on said frame;
  (c) a second jaw swingably mounted on said frame and opposed to said first jaw for reception of a tree trunk therebetween;

(d) portions of said first and second jaws being shiftable in a horizontal plane;

(e) a plurality of blade retaining plates pivotally mounted on each of said jaws;

(f) a vertical blade concavely formed toward the tree trunk secured to an inwardly directed edge of each of said retaining plates, each of said vertical blades terminating upwardly in an impact edge;

(g) cam means connecting said shiftable jaw portions and said blade retaining plates for advancing and retracting said vertical blade from a trunk of a tree, and (h) lift means secured to said mounting frame for swiftly raising the entire assemblage vertically along the trunk of a standing tree so as to shear by impact the branches therefrom.

2. A cutter head assemblage as defined in claim 1 and including:

(a) means forcibly abutting said first and second jaws together at their outer ends; and (b) power means adapted to shift said shiftable jaw portions for effecting advancing and retracting of said vertical blades.

3. A cutter head assemblage for delimbing standing trees which comprises:

(a) a mounting frame adapted to be positioned adjacent the trunk of a tree;

(b) a first jaw swingably mounted on said frame;

(c) a second jaw swingably mounted on said frame and opposed to said first jaw for reception of a tree trunk therebetween;

(d) a plurality of horizontal plates pivotally mounted on each of said jaws;

(e) a vertical blade concavely formed toward the tree trunk secured to an inwardly directed edge of each of said horizontal plates, each of said vertical blades terminating upwardly in an impact edge;

(f) portions of said first and second jaws being shiftable in a horizontal plane;

(g) cam means connecting said shiftable jaw portions and said horizontal plates for advancing and retracting said vertical blades from the trunk of a tree, and (h) lift means secured to said mounting frame for swiftly raising the entire assemblage vertically along the trunk of a standing tree so as to shear by impact the branches therefrom.

4. A cutter head assemblage for delimbing standing trees which comprises:

(a) a mounting frame adapted to be positioned adjacent the trunk of a tree;

(b) a first jaw swingably mounted on said frame;

(c) a second jaw swingably mounted on said frame and opposed to said first jaw for reception of a tree trunk therebetween;

(d) shearing means including a plurality of blade retaining plates pivotally mounted on a vertical axis on each of said jaws, said blade retaining plates having blades secured thereto with upwardly directed impact edges adapted to lie adjacent the trunk of a tree;

(e) portions of said first and second jaws being shiftable in a horizontal plane;

(f) cam slots formed in said shiftable jaw portions;

(g) cam follower pins secured to said shearing means and respectively engaging said cam slots for advancing and retracting said blades from the trunk of a tree when said jaw portions are correspondingly shifted, and (h) lift means secured to said mounting frame for swiftly raising the entire assemblage vertically along the trunk of a standing tree so as to shear by impact the branches therefrom.

5. A cutter head assemblage for delimbing standing trees which comprises:

(a) a base ring having a pair of arcuate portions shiftable about a first pivot axis and into encircling relation with the trunk of a tree;

(b) a cam plate ring also having a pair of arcuate portions shiftable about a second pivot axis and into encircling engagement with said tree trunk at a position vertically offset from that of said base ring, said cam plate ring being rotatably mounted relative to said base ring;

(c) a plurality of blade retaining plates pivotally mounted on said base ring for shifting toward and away from the trunk of an encircled tree, said blade retaining plates having blades secured thereto with upwardly directed impact edges adapted to lie adjacent the trunk of the encircled tree;

(d) cam follower means connecting said cam plate ring and said blade retaining plates; and (e) means connected to said base ring and to said cam plate ring to arcuately shift said cam plate ring with respect to said blade retaining plates and thereby to shift said blade retaining plates with respect to the tree trunk, said base ring arcuate portions and said cam plate ring arcuate portions being disengageable from the tree trunk when said first and second pivot axes lie in vertically registered alignment and said arcuate portions respectively being locked in encircling engagement when said axes are shifted out of vertically registered alignment.

6. The cutter head assemblage as defined in claim 5 being particularly characterized in that:

(a) a plurality of rollers are mounted on spaced vertical axes peripherally of said base ring and in a horizontal plane axially offset from said base ring, with said cam plate ring having peripheral arcuate edges mounted in said rollers.

7. The cutter head assemblage as defined in claim 5 being particularly characterized in that:

(a) said cam plate ring arcuate portions have cam slots formed therein, and cam follower pins secured to said blade retaining plates are disposed in engagement with said cam slots.

8. A cutter head assemblage for delimbing standing trees which comprises:

(a) a base ring having a pair of arcuate portions to encircle the trunk of a tree;

(b) a vertical pivot connection between said base ring arcuate portions laterally offset from the axis of an encircled tree;

(c) a cam plate ring having a pair of arcuate portions to encircle the trunk of a tree at a position vertically offset from that of said base ring, said cam plate ring being rotatably mounted relative to said base ring;

(d) a vertical pivot connection between said cam plate arcuate portions laterally offset from the tree axis;

(e) a plurality of blade retaining plates pivotally mounted on said base ring for shifting toward and away from the trunk of an encircled tree, said blade retaining plates having blades secured thereto with upwardly directed impact edges adapted to lie adjacent the trunk of the encircled tree;

(f) cam follower means connecting said cam plate ring and said blade retaining plates; and (g) means connected to said base ring and to said cam plate ring to arcuately shift said cam plate ring with respect to said blade retaining plates and thereby to shift said blade retaining plates and said blades with respect to the tree trunk, said cam plate ring and said base ring being adapted to swing open when their respective vertical pivot connections are moved into vertical alignment.

9. A cutter head assemblage for delimbing standing trees which comprises:

(a) a mounting frame adapted to be positioned adjacent the trunk of a tree;

(b) a first jaw swingably mounted on said frame;

(c) a second jaw swingably mounted on said frame and opposed to said first jaw for reception of a tree trunk therebetween;
(d) a plurality of horizontally disposed plates pivotally mounted on a vertical axis on each of said jaws with at least one of said plates being mounted on each of said jaws;
(e) shearing means rigidly secured to each of said horizontally disposed plates, said shearing means having upwardly directed impact edges adapted to lie adjacent a trunk of a tree;
(f) portions of said first and second jaws being shiftable in a horizontal plane;
(g) cam means connecting said shiftable jaw portions and said shearing means for advancing and retracting said shearing means from a trunk of a tree, and
(h) lift means secured to said mounting frame for swiftly raising the entire assemblage vertically along the trunk of a standing tree so as to shear by impact the branches therefrom.

References Cited by the Examiner

UNITED STATES PATENTS

| | | |
|---|---|---|
| 1,943,649 | 1/34 | White et al. |
| 2,583,971 | 1/52 | Shuff. |

FOREIGN PATENTS

| | | |
|---|---|---|
| 119,397 | 10/58 | Russia. |

WILLIAM W. DYER, Jr., *Primary Examiner.*
DONALD R. SCHRAN, *Examiner.*